3,205,746
GLASS SHEARS
Clinton R. Copeland, East Rochester, N.Y., assignor to Bausch & Lomb Incorporated, Rochester, N.Y., a corporation of New York
Filed Sept. 27, 1962, Ser. No. 226,509
5 Claims. (Cl. 83—555)

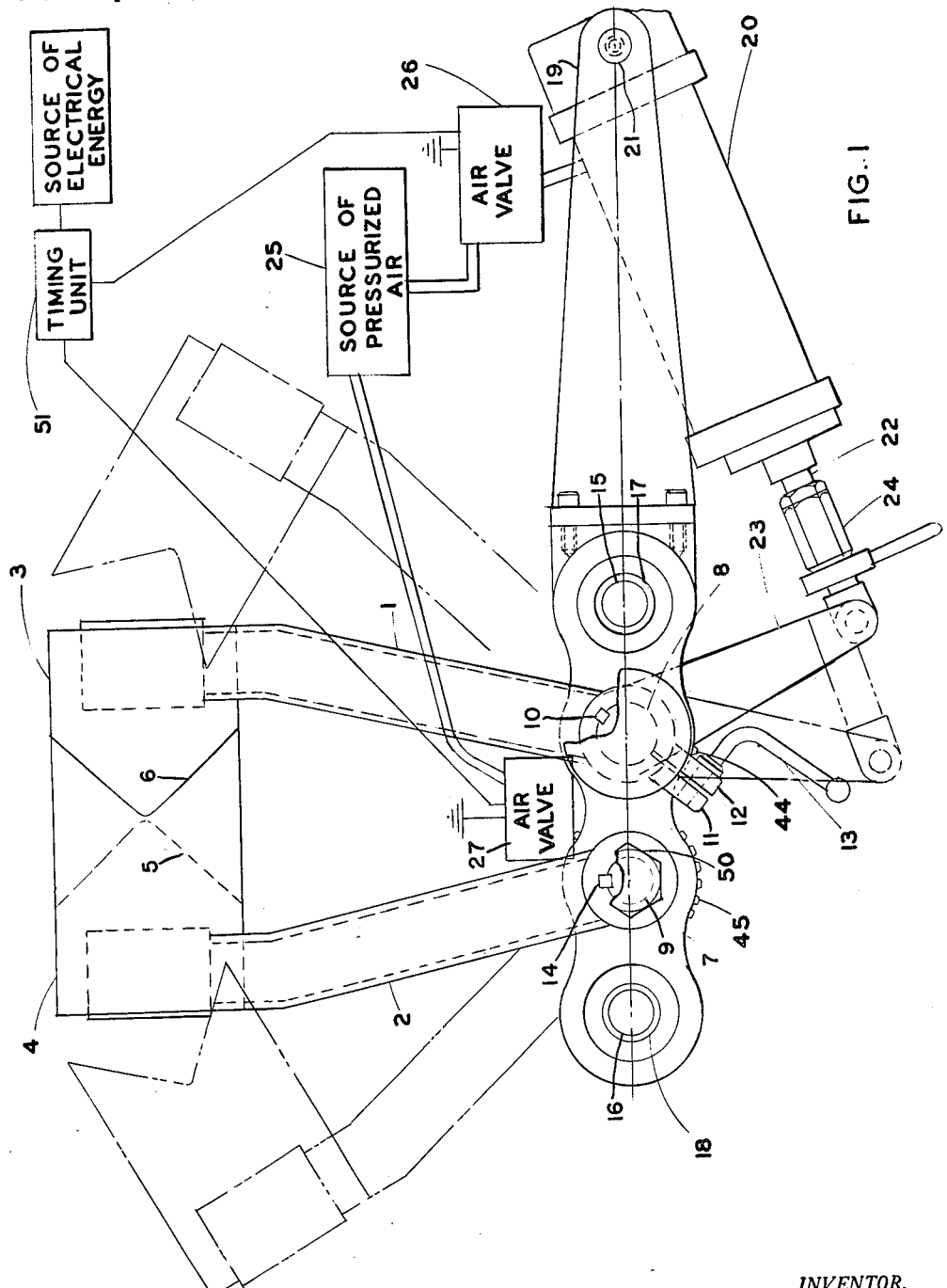

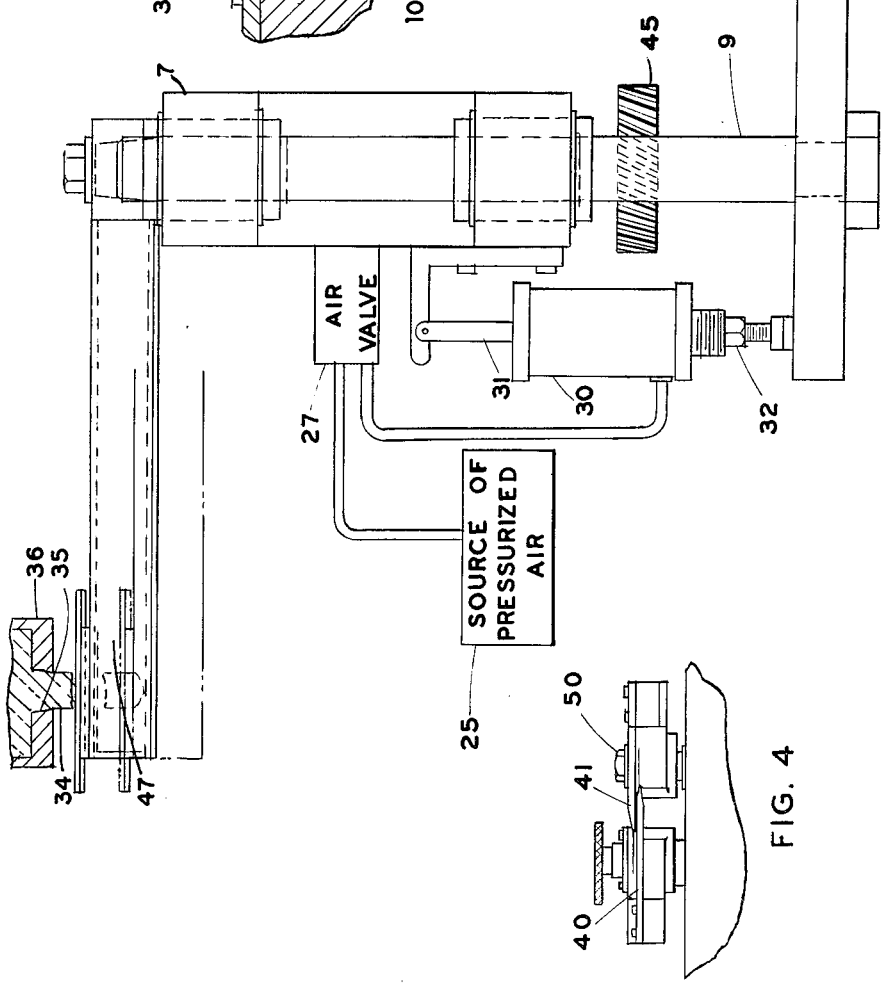

This invention relates to a glass making apparatus and more particularly to a glass shears for shearing a stream of molten glass.

Shearing a stream of molten glass of equal intervals of time serves to meter a desired quantity of glass to form the lens blank. It is imperative that a minimum of heat transfer is present from the molten glass to the shearing mechanism. Accordingly this invention provides a means for shearing glass which will cleanly shear a gob from a stream of molten glass and cause a minimum of heat transfer from the molten glass to the shearing means. In this manner any thermal history mark can be eliminated from the finished lens blank.

It is an object of this invention to provide a glass shears.

It is another object of this invention to provide a glass shears having a pivoting action in the plane of rotation of the shearing elements and a slidable action normal to the plane of rotation of the shearing elements.

It is a further object of this invention to provide a vertical adjustment of the shearing elements individaully or collectively relative to the supporting means for the shearing elements.

It is a further object of this invention to provide a shearing action by the shearing elements operating in a plane normal to a stream of molten glass and a slidable means operating axially parallel to the stream of molten glass and thereby maintaining the increment of time of contact between the shearing elements and the molten glass at a minimum for reducing heat transfer.

The objects of this invention are accomplished by providing a supporting member having vertical columns. A shearing mechanism is slidably mounted on similar vertical columns and includes means for pivotally supporting the shearing elements for rotation in a plane normal to the axis of the vertical columns. An actuating means is connected to the shearing elements to pivotally operate the elements to sever a portion of a stream of molten glass. A reciprocating actuator operating responsive to the shearing action operates on an axis parallel to the axis of rotation of the shearing elements and the vertical columns to withdraw the blades immediately upon shearing a portion of the stream of molten glass. In this manner a portion of the stream of molten glass is rapidly sheared and then withdrawn from the remaining portion of the stream of molten glass to reduce heat transfer to the shearing elements and thereby eliminate any thermal history mark which may be evident in the molded lens blank.

The preferred embodiment of the invention is shown in the accompanying drawings of which the following illustrate.

FIG. 1 is a plan view of the shearing mechanism.

FIG. 2 is a side elevational view of the shearing mechanism.

FIG. 3 is a fragmentary sectional view of the individual vertical adjustment of one of the shearing arms.

FIG. 4 is a fragmentray view illustrating the shearing mechanism as the shearing elements are in the shearing position.

Referring to the drawings FIG. 1 illustrates the shearing mechanism during the shearing operation. A second position is illustrated in phantom lines to show the position of the mechanism as the mechanism is in its normally retracted position.

The arms 1 and 2 are pivotally supported about individual axes. The blade 3 is fastened to the arm 1 and the blade 4 is fastened to the arm 2. In the position as shown the cutting edges 5 and 6 respectively of the blades 3 and 4 are overlapping to completely sever a portion of the stream of molten glass which is normally positioned centrally with the blades.

The bracket 7 supports the shafts 8 and 9. The shaft 8 carries a key 10 which is received in the mating slots of the arm 1 and the shaft 8. The flanges 11 and 12 which are integral with arm 1, lock the arm 1 to the shaft 8 as the locking screw 13 is tightened. The arm 2 has a central opening which receives the shaft 9 and is tapered to provide a firm seat for the arm 2 on the shaft 9. The key 14 is fitted in the mating grooves in the arm 2 and the shaft 9 to cause the shaft 9 and arm 2 to rotate as a unit. The arm 2 is locked to the shaft 9 by a nut 50 screwed on the end of the shaft.

The bracket 7 is slidably mounted on the columns 15 and 16 by means of the bushings 17 and 18. The bracket 7 slides vertically on the columns 15 and 16 in response to a motor.

The bracket 7 also supports a brace 19 which extends laterally from the bracket and pivotally supports the air cylinder 20 by means of the pin 21. A piston within the cylinder 20 is connected to a rod 22 which extends externally of the cylinder and is connected to the extension 23 by means of the adjusting mechanism 24. As the piston within the cylinder 20 is operated the extension 23 which is connected to the shaft 8 pivots the arm 1. A gear drive mechanism on the lower ends of shafts 8 and 9 operates the arm 2 simultaneously with arm 1.

The air cylinder 20 is operated by pressurized air supplied by the source of pressurized air 25 which is fed into the air cylinder through the air valve 26. The air valve 27 controls the air cylinder 30 for movement of the bracket 7 in a vertical direction subsequent to the shearing action of the shearing mechanism. For the purpose of illustration air cylinders have been disclosed although any suitable motor means might be utilized to operate the shearing mechanism and sliding mechanism.

Referring to FIG. 2 the vertical columns 13 and 16 are mounted in the support 28. The bracket 7 is slidably supported on the columns and is positioned by the air cylinder 30, the rod 31 and adjustable mechanism 32. The position of the shearing mechanism supported by the bracket 7 is adjusted vertically by the adjusting mechanism 32. An individual adjustment of the arm 1 may be accomplished through the individual vertical adjustor 33 which is more clearly shown in the fragmentary sectional view in FIG. 3. The air cylinder 30 is operated by pressurized fluid controlled by the air valve 27. The air valve 27 is operated in response to the timing unit 51 to cause a withdrawal of the arms 1 and 2 from the unsevered portion of the stream of molten glass 34 from the orifice 35 in the container 36. The phantom view of the arms illustrates the second position of the shearing elements as they are withdrawn from the stream of molten glass. The movement to the second position is immediately subsequent to the shearing of the portion 47 from the stream 34 of molten glass.

Referring to FIG. 3 the knurled nob 37 is connected to a shank 38 which is threadedly connected to the shaft 8. A shoulder is provided on each of the upper and lower side of the flange 39 to move the arm 1 with the movement of the shank 38 in response to rotation of the knurled nob 37. This causes an elevating or lowering of the arm 1 which may be subsequently tightened on the shaft 8 by the screw 13 to maintain a relative vertical position of the arm 1 in relation to the arm 2.

Referring to FIG. 4 the relative movement of arm 1 in relation to arm 2 controls the degree of tension on the blades 3 and 4 which are connected to the arms 1 and 2. The actuating of the shearing mechanism is controlled by a suitable valve arrangement to cause the shearing elements 3 and 4 to engage each other and then sever a portion of the stream of molten glass 34. Immediately subsequent to shearing of the portion of molten glass the arms 1 and 2 and blades 3 and 4 are withdrawn from the position adjacent the orifice 35 in axial manner which is controlled by the direction of the axis of shafts 15 and 16.

The operation of the mechanism will be described in the following paragraphs. The phantom view of FIG. 1 illustrates the normally retracted position of the shears. The air valve 26 provides communication between the source of pressurized air 25 and the air cylinder 20. The actuation of the air valve 26 may be in response to a timer using electrical impulse, or any suitable means to provide shearing at the desired rate in accordance with the flow of molten glass from the orifice 34. The illustration shows a timer unit 51 to control the shearing. As the air cylinder is actuated the rod 22 moves the extension 23 from the phantom or open position to the closed position as shown. The extension 23 is connected directly to the shaft 8 which in turn is connected to the arm 1. The gear 44 on shaft 8 is constantly meshing with the gear 45 on shaft 9 automatically causes a pivoting of the arms 1 and 2 in unison. The arms 1 and 2 converge on each other causing an engagement of the blades 3 and 4 and a shearing of the stream of molten glass 34. Immediately upon severing the stream of molten glass the air valve 27 is actuated causing the air cylinder 30 to lower the arms 1 and 2. The arms 1 and 2 immediately move to the phantom position as illustrated in FIG. 2 limiting contact of the cutting blades 3 and 4 with the stream of molten glass 34. The gob 47 is completely severed from the stream of molten glass 34 and withdrawn in a downward manner and then deposited in a suitable glass receiving means. As the shearing mechanism reaches its downward most position the arms 1 and 2 move outwardly from ecah other and then upward in response to the timing unit and air valves 26 and 27. The arms again return to their normally retracted position which is in the upward position with the arms extended from each other as the cycle is completed.

The adjusting device 32 provides a means for vertically moving the bracket 7 which carries the arms 1 and 2 and the cutting blades 3 and 4 relative to the support 28. In this manner the shearing blades 3 and 4 are adjusted vertically relative to the orifice 35. The desired position of severing the stream of molten glass 34 may be accurately regulated in this manner.

The tension of the blades 3 and 4 as they engage each other is adjustable through the adjusting means 33. This adjustment provides for a clean shearing of the gob from the stream of molten glass and provides a means for adjustment due to wear as well.

The preferred embodiment is illustrated and described of which other modifications might be shown which fall within the scope of the invention. The following attached claims define the scope of the invention.

I claim:

1. A glass shearing means comprising, a supporting means including means defining a vertical extending guideway, bracket means slidably mounted on said guideway of said supporting means, a first shearing member pivotally mounted on said bracket means for rotation in a plane normal to the slidable movement of said bracket means, a second shearing member engaging said first shearing member pivotally mounted on said bracket means for rotation in a plane normal to the slidable movement of said bracket means, a vertical adjusting means on the first of said shearing members to individually adjust said first shearing member axially relative to said second shearing member without changing blade angle, and means to vertically adjust both of said shear members relative to said supporting means, actuating means connected to said shearing members pivotally operating said shearing members and operating means connected to said bracket means and said supporting means slidably operating said bracket means subsequently to shearing and thereby shearing a stream of molten glass and withdrawing the sheared portion from the unsheared portion to reduce heat transfer from the molten glass to said shearing means.

2. A glass shearing means comprising, a supporting means, a plurality of vertical columns supported on said supporting means, bracket means slidably mounted on said vertical columns for axial movement relative to said columns, two shearing members, means rotatably supporting said shearing members about axes parallel to said vertical columns on said bracket means and pivotally supporting said shearing members for shearing a stream of molten glass, said shearing members pivotally operating in a plane normal to the axis of rotation of said shearing members, actuating means connected to said shearing members and said bracket means pivotally operating said shearing members initially and operating means on said supporting means connected to said bracket means slidably operating said bracket subsequently to the shearing operation means to thereby shear a stream of molten glass in a plane normal to the axis of the vertical columns and slidably withdraw the sheared portion from the unsheared portion axially relative to the stream of molten glass to reduce the heat transfer from the molten glass to said shearing means.

3. Glass shearing means comprising, a supporting means constructed and arranged to provide a vertical slidable support, a slidable bracket means slidably mounted on said supporting means, means on said bracket means defining rotatable supports having axes parallel to the slidable movement of said bracket means, shearing members pivotally mounted on said means forming said rotatable supports for operation in a plane normal to the axis of rotation of said shearing members, actuating means connected to said shearing members and said bracket means pivotally operating said shearing members and operating means connected to said supporting means and said bracket means slidably operating said bracket means subsequent to shearing by said members to thereby provide a shearing means adapted to initially shear a stream of molten glass in a plane normal to the movement of said bracket means and withdraw the sheared portion from the unsheared portion of said stream of molten glass for reducing heat transfer from the molten glass to the shear to eliminate thermal history marks on the molten glass.

4. A glass shearing means comprising a supporting means, a plurality of shaft means two of which are mounted in said supporting means, bracket means slidably mounted on said two of said shaft means, a second two of said shaft means mounted on said bracket means first and second, shearing members pivotally supported on said second two of said shaft means actuating means on said bracket means connected to said shearing members pivotally operating said shearing members, a screw and lock on the first of said shearing members and engaging the one of said second shaft means supporting said first shearing member for axially adjusting the first of said shearing members relative to the second of said shearing members to control tension on said members during cutting operation, and on said supporting means and connected to said bracket means, operating means slidably operating said bracket means subsequently to the cutting operation thereby providing a shearing means adapted for shearing in a horizontal plane and withdrawing downwardly from the non-sheared portion of a stream of molten glass to reduce heat transfer from the molten glass to the shearing means for eliminating thermal history marks in the molten glass.

5. A glass shearing means comprising, supporting means including vertically extending shaft means, bracket means slidably mounted on said shaft means including, a first shaft on said bracket means and a first shearing member rotatably mounted on said first shaft, a second shaft on said bracket means and a second shearing member rotatably mounted on said second shaft, actuating means on said bracket means connected to said shearing members rotating said shearing members relative to each other to initially provide a shearing operation, operating means on said supporting means connected to said bracket means reciprocally moving said bracket means subsequent to the shearing operation, an adjusting means mounted on the first of said shearing members including a screw threadedly engaging said first of said shafts and axially moving the first of said shearing members as a unit relative to the first of said shafts to adjust the tension of said shearing members, a locking means on said first shearing member locking said first shearing member on said first shaft to thereby provide a means for adjusting the pressure of engagement of said shearing members with each other.

References Cited by the Examiner

UNITED STATES PATENTS

| | | | |
|---|---|---|---|
| 1,953,030 | 3/34 | Sterrett | 83—600 X |
| 2,092,650 | 9/37 | Link et al. | 83—600 |
| 2,164,184 | 6/39 | Wadsworth | 65—133 X |
| 2,202,409 | 5/40 | Wadsworth | 65—334 X |
| 2,252,392 | 8/41 | Benoit et al. | 65—334 X |
| 2,472,560 | 6/49 | Avery | 83—600 |
| 2,678,518 | 5/54 | Honiss | 83—600 |

ANDREW R. JUHASZ, *Primary Examiner.*

DONALD R. SCHRAN, *Examiner.*

UNITED STATES PATENT OFFICE
CERTIFICATE OF CORRECTION

Patent No. 3,205,746                      September 14, 1965

Clinton R. Copeland

It is hereby certified that error appears in the above numbered patent requiring correction and that the said Letters Patent should read as corrected below.

Column 1, line 66, for "fragmentray" read -- fragmentary --; column 2, line 44, for "13" read -- 15 --; column 3, line 42, for "ecah" read -- each --; column 4, line 25, after "bracket" insert -- means --; line 26, strike out "means".

Signed and sealed this 19th day of April 1966.

(SEAL)
Attest:

ERNEST W. SWIDER
Attesting Officer

EDWARD J. BRENNER
Commissioner of Patents